Figure 1:
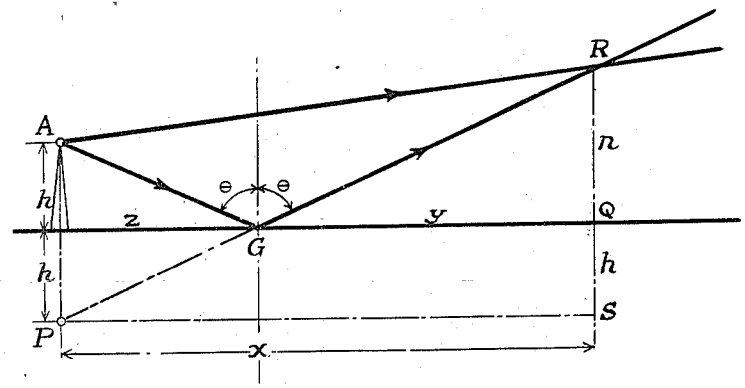

March 10, 1942.    G. L. DAVIES    2,275,673
APPARATUS FOR CONTROLLING THE GLIDE PATH FOR RADIO LANDING OF AIRCRAFT
Original Filed Dec. 18, 1935

Inventor
Gomer L. Davies
By Samuel Scrivener Jr.
Attorney

Patented Mar. 10, 1942

2,275,673

UNITED STATES PATENT OFFICE 2,275,673

APPARATUS FOR CONTROLLING THE GLIDE PATH FOR RADIO LANDING OF AIRCRAFT

Gomer L. Davies, Cleveland, Ohio, assignor to Washington Institute of Technology, Inc., Washington, D. C., a corporation of Delaware Application December 18, 1935, Serial No. 55,129
Renewed November 26, 1937

6 Claims. (Cl. 250—11)

REISSUED

AUG 11 1942

This invention relates to a method and apparatus for controlling the shape of a line of constant field intensity in space.

In order to provide a path to ground for the landing of aircraft it has heretofore been proposed to provide a parabolic "beam," the lowest point of which is tangent to the surface of the ground, and which may be employed by aircraft as a path to ground during periods of low visibility, or for purposes of traffic control at airports. Until the present invention, however, no means have been known for controlling or adjusting the shape of such "beams," although some such means has been desirable and necessary for proper operation thereof.

It is therefore an object of the invention to provide methods and means for controlling and adjusting the shape and spatial position of a line of constant field intensity in space in order to provide different paths to ground and whereby the path to ground may be adjusted to clear and avoid local obstructions or physiographic obstacles.

Other objects and features of novelty will be apparent from the following description and the annexed drawing, it being expressly understood, however, that the invention is in no way limited by such description and drawing or otherwise than by the appended claims.

Figure 2:
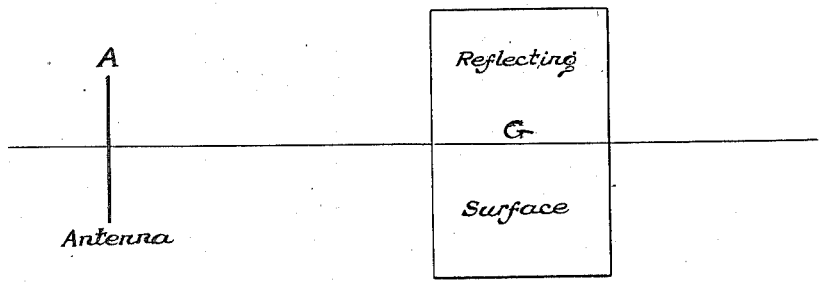

Referring to the drawing,

Fig. 1 is a schematic view showing the nature of certain of the radiations producing the line of constant field intensity which it is desired to control, and Fig. 2 is a view showing a possible arrangement of the reflecting surface with respect to the transmitting antenna.

In order to provide a radio path to ground for use in the landing of aircraft, it has been proposed to energize a horizontally arranged antenna, such as that shown at A in the drawing, to produce a horizontally polarized radiation field about such antenna.

It will be apparent that a vertical antenna array may be employed and that the radiating array, whether composed of horizontal or vertical elements, may be energized by suitable means which may be situated above or below the surface of the ground. This antenna array is located adjacent the ground, and it has been found that certain of the radiations from the antenna travel along a straight line AR to the receiver R which may be located on an aircraft. Other radiations such as AG will travel toward the ground from the antenna and will be reflected therefrom to receiver R along the line GR.

The field intensity at receiver R resulting from the radiations from antenna A is a function of the direct radiation along line AR and the reflected radiation along line AGR. For fixed transmitting conditions the difference in the phase of radiations received along these two lines determines a line of constant field intensity defining a path to ground from R. If the transmitting conditions at A are varied, as by varying the power input to antenna A, the position of the line of constant field intensity from R to ground will be varied. This, however, is not a means for varying the shape of the line of constant field intensity.

Considering the field intensity at receiver R due to radiations from antenna A, it may be shown that the phase difference $\phi$ between the direct and reflected radiations due to the difference between the paths AGR and AR is given by the equation $$\phi = \frac{4\pi h n}{\lambda x}$$

in which $h$ is the height of antenna A above ground, $n$ is the height of receiver R above ground, $\lambda$ is the wave length of the radiations from A, and $x$ is the horizontal distance from antenna A to receiver R.

If the reflection co-efficient at G is $K = M + jN$, and the field due to the antenna A in space at distance $x$ is $$E_0 = \frac{AI}{x}$$

where A is a constant and I is the antenna current, then the field intensity at R is $$E = E_0 + E_0(M+jN)(\cos \phi - j \sin \phi) \quad (1)$$
$$= E_0[1 + M \cos \phi + N \sin \phi + j(N \cos \phi - M \sin \phi)]$$

This expression has been obtained by taking the phase of the direct ray as a reference phase. Other forms of the expression may be obtained by taking different reference phases. Thus, if the reference phase is that of the reflected ray without the phase shift due to reflection, then $$E = E_0(\cos \phi + j \sin \phi) + E_0(M+jN) \quad (2)$$
$$= E_0[M + \cos \phi + j(N + \sin \phi)]$$

If a reference phase midway between the above two is taken, then $$E = E_0\left(\cos \frac{\phi}{2} + j \sin \frac{\phi}{2}\right) + E_0(M+jN)$$
$$\left(\cos \frac{\phi}{2} - j \sin \frac{\phi}{2}\right)$$
$$= E_0\left[(1+M) \cos \frac{\phi}{2} + N \sin \frac{\phi}{2} + j\left\{N \cos \frac{\phi}{2} + (1-M) \sin \frac{\phi}{2}\right\}\right]$$

All three of these forms are equivalent and may be used interchangeably, the choice being dictated by convenience. In general, we may denote the field intensity E by the equation $$E = E_0(P + jQ)$$

or, since we are concerned with magnitude only $$E = E_0\sqrt{P^2 + Q^2} = \\ E_0\sqrt{1 + M^2 + N^2 + 2M\cos\phi + 2N\sin\phi} \quad (3)$$

It will be seen that, by the latter expression, I have set forth the general case of the field intensity at any point in space resulting from the radiation from a horizontal antenna arranged relatively near to the earth, the field intensity being here defined in terms of the reflection co-efficient.

As stated hereinbefore methods of varying the shape of the line of constant field intensity defining a path to ground from a receiver in space have long been sought. I have found that such variation of the path shape may be achieved to any desired extent by variation of the reflection co-efficient of the surface at the point or area G. In the preceding mathematical definition of the field intensity at any point in space resulting from the radiations from antenna A, I have shown that the field strength at receiver R may be shown to be a function of the reflection co-efficient of the surface at G. By this invention, therefore, I propose to vary the shape of the line of constant field intensity resulting from the direct and reflected radiations from an antenna, by varying, as desired or as required to secure a desired path shape, the reflection co-efficient of the surface at and adjacent to the point or area of reflection of the reflected radiations.

The means by which this method may be carried out may take a number of forms, the choice depending largely on the nature of the path variation which is desired or necessary. It has been determined that the average co-efficient of reflection of the ground is approximately —.95. This value varies somewhat with the angle of elevation and may vary considerably with major variations in the character of the ground at the area of reflection at different landing areas. If the path shape is found to be too flat, I have found that it may be made steeper by substituting for the normal reflecting surface at the reflecting area some material having a low co-efficient of reflection with respect to that of the normal ground surface at the reflecting area. I have found that some granular material, such as a layer of sand, substituted for or superimposed upon the normal ground reflecting surface at the area of reflection may be employed to secure a sharper or steeper path if this be desired or dictated by the physiographic character of the area surrounding the landing area, or by artificial obstructions which must be cleared. Obviously, other materials may be employed to increase the steepness of the path, and the choice of materials for the prepared reflecting surface will depend on the nature of the path variation desired and the co-efficient of reflection of the normal ground surface at the reflecting area. If it is desired to provide a flatter path, i. e. make the shape of the path approach more nearly the surface of the earth, I have found that a material having a co-efficient of reflection higher than that of the normal ground surface should be substituted for the ground reflecting surface at and/or adjacent to the point or area of reflection. For this purpose any material having a co-efficient of reflection approaching —1.0, such for example as sheet iron, may be employed in usual cases.

It will be apparent that variation of the nature of the reflecting surface to vary the co-efficient of reflection thereof will vary the terms M and N in Equation 3 above, thereby varying the field intensity at the receiver R. The total field strength E remains constant due to the fact that the power input to antenna A remains unchanged and it will therefore be apparent from a study of the equation that the value of $\phi$ must vary as M and N are varied. Inasmuch as the field strength at receiver R is a function of the direct and reflected radiations, the phase difference of which is $\phi$, it will be apparent that the line of constant field intensity must vary with $\phi$, whereby this path to ground is adjusted as desired.

The point G at which the prepared reflecting surface is to be placed may be determined from the geometric relations of the distances and angles set forth in Fig. 1. Referring to this figure, it will be seen that in the triangles GRQ and PRS, $$\frac{GQ}{PS} = \frac{RQ}{RS}$$

or $$\frac{x-z}{x} = \frac{n}{n+h}$$

or $$x(n+h) - z(n+h) = nx$$
$$z(n+h) = x(n+h) - nx = xh$$

Then $$z = \frac{xh}{n+h} = h\left(\frac{x}{n+h}\right) = h\tan\theta$$

Or, the horizontal distance from the antenna to the point of reflection is equal to the height of the antenna above ground multiplied by the tangent of the angle of incidence of the reflected radiation.

While I have described in this application certain means which may be employed to carry out the method set forth, it is to be distinctly understood that the invention is not in any way limited by the means so set forth, but that other specific means may be employed without in any way departing from the spirit or scope of the invention. For example, while I have disclosed only a single, horizontal antenna, the invention includes within its scope the control of the shape of a line of constant field intensity due to radiations from any number of horizontal or vertical antennas, such as a transmitting array consisting of one, two, three or more horizontal or vertical antennas arranged end to end. Further, any one of a large number of reflecting materials and means may be employed, either to increase or decrease the co-efficient of reflection of the reflecting surface, all without in any way departing from the scope of the invention, for the limits of which reference must be had to the appended claims.

I claim:

1. A radio system for providing a path to ground for landing aircraft, having a pre-determined shape and a pre-determined angle to the plane of the landing area toward which the path provides guidance, comprising means for establishing a line of constant field intensity having its origin in the plane of the landing area and extending upwardly into space, said means including an antenna array disposed above the plane of the landing area and being so constructed and energized as to produce radiations which travel directly into space and radiations which are reflected from the plane of the landing area and which direct and reflected radiations define said path, and a prepared reflecting surface formed of a material which is chosen because of its reflecting characteristics to cause the path to ground to have a pre-determined shape and angle of elevation with respect to the plane of the landing area, said prepared reflecting surface being spaced from the antenna array by a distance determined by the pre-determined shape and angle of elevation of the path to ground.

2. In a method for vertical guidance of aircraft with respect to a terrain including a landing area, the improvement which consists in propagating a non-directional radiated field providing vertical guidance courses serving a number of different directions, and modifying the slope of the vertical guidance courses in a predetermined degree in accordance with the obstructional characteristics of the terrain in the direction to be served.

3. In a system for vertical guidance of aircraft with respect to a terrain including a landing area, in combination, means for propagating a non-directional radiated field providing vertical guidance courses serving a number of different directions, and means for modifying the slope of the vertical guidance courses in a predetermined degree in accordance with the obstructional characteristics of the terrain in the direction to be served.

4. In a method for vertical guidance of aircraft with respect to a terrain including a landing area, the improvement which consists in propagating a non-directional radiated field providing vertical guidance courses serving a number of different directions, and varying the intensity of the radiated field by amounts predetermined to correspond with the obstructional characteristics of the terrain in the direction to be served.

5. In a system for vertical guidance of aircraft with respect to a terrain including a landing area, in combination, means for propagating a non-directional radiated field providing vertical guidance courses serving a number of different directions, and means calibrated and operable to vary the intensity of the radiated field by predetermined amounts coordinated with the obstructional characteristics of the terrain in the direction to be served.

6. In a method for vertical guidance of aircraft with respect to a terrain including a landing area, the improvement which consists in propagating at a source a radiated field non-directional in horizontal and vertical planes, thus providing directly propagated components and components reflected from the terrain surrounding the source of which the resultants in space produce a field strength beyond one wave length from the source increasing with height to provide a landing path, said propagation thus providing vertical guidance courses serving a number of different directions, and varying the intensity of the radiated field by amounts predetermined to correspond with the obstructional characteristics of the terrain in the direction to be served.

GOMER L. DAVIES.